United States Patent
Okabe et al.

(10) Patent No.: US 10,305,793 B2
(45) Date of Patent: May 28, 2019

(54) COMMUNICATION DEVICE FOR SWITCHING STACKS AND METHOD OF CONTROLLING EXECUTION OF STACKS

(71) Applicant: YOKOGAWA ELECTRIC CORPORATION, Tokyo (JP)

(72) Inventors: Nobuo Okabe, Tokyo (JP); Yukiyo Akisada, Tokyo (JP); Kazunori Miyazawa, Tokyo (JP); Yasuki Sakurai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 270 days.

(21) Appl. No.: 14/400,748

(22) PCT Filed: May 29, 2013

(86) PCT No.: PCT/JP2013/064882
§ 371 (c)(1),
(2) Date: Nov. 12, 2014

(87) PCT Pub. No.: WO2013/180167
PCT Pub. Date: Dec. 5, 2013

(65) Prior Publication Data
US 2015/0172181 A1    Jun. 18, 2015

(30) Foreign Application Priority Data

May 30, 2012    (JP) .................. 2012-123139

(51) Int. Cl.
*G06F 15/16*    (2006.01)
*H04L 12/713*    (2013.01)
(Continued)

(52) U.S. Cl.
CPC .......... *H04L 45/586* (2013.01); *G06F 9/4411* (2013.01); *G06F 9/44526* (2013.01);
(Continued)

(58) Field of Classification Search
CPC ...... H04L 45/586; H04L 69/18; G06F 9/4411; G06F 9/44526; H04W 88/16; H04W 52/0206
See application file for complete search history.

(56) References Cited

U.S. PATENT DOCUMENTS

| 4,214,304 A * | 7/1980 | Shimizu | ................ G06F 9/4881 711/152 |
| 6,850,335 B1 * | 2/2005 | Barry | .................... G06F 3/1215 358/1.13 |

(Continued)

FOREIGN PATENT DOCUMENTS

| JP | 2002-158735 A | 5/2002 |
| JP | 2003-101917 A | 4/2003 |

(Continued)

OTHER PUBLICATIONS

International Search Report for PCT/JP2013/064882 dated Aug. 27, 2013.

(Continued)

*Primary Examiner* — Aftab N. Khan
*Assistant Examiner* — Anh Nguyen
(74) *Attorney, Agent, or Firm* — Sughrue Mion, PLLC

(57) ABSTRACT

A communication device conforming with plural communication standards and having a storage storing a plurality of virtual stacks each having an application program and communication program that implements a protocol stack for communication by the application program. An executor executes the virtual stacks, and a switching controller switches the virtual stacks to be executed by performing a first processing in which at least one part of at least one of the virtual stacks is read from storage and stored into a memory of, and executed by, the executor. Then, in accordance with free capacity in the memory, at least one part of at least one of the virtual stacks executed in the first (Continued)

processing is deleted from memory. In a second processing at least one part of at least one of the virtual stacks is read from the storage and stored into the memory of, and executed by, the executor.

15 Claims, 13 Drawing Sheets

(51) Int. Cl.
<table>
<tr><td>H04L 29/06</td><td>(2006.01)</td></tr>
<tr><td>H04W 52/02</td><td>(2009.01)</td></tr>
<tr><td>H04W 88/16</td><td>(2009.01)</td></tr>
<tr><td>G06F 9/4401</td><td>(2018.01)</td></tr>
<tr><td>G06F 9/445</td><td>(2018.01)</td></tr>
</table>

(52) U.S. Cl.
CPC ......... *H04L 69/18* (2013.01); *H04W 52/0206* (2013.01); *H04W 88/16* (2013.01); *Y02D 10/43* (2018.01); *Y02D 70/00* (2018.01); *Y02D 70/144* (2018.01); *Y02D 70/162* (2018.01); *Y02D 70/166* (2018.01)

(56) References Cited

U.S. PATENT DOCUMENTS

| | | | |
|---|---|---|---|
| 7,890,664 B1* | 2/2011 | Tao | G06F 9/4411 710/15 |
| 2005/0238050 A1* | 10/2005 | Pung | H04L 69/22 370/469 |
| 2005/0257012 A1* | 11/2005 | Hughes | G06F 13/1605 711/151 |
| 2006/0031644 A1* | 2/2006 | Hughes | G06F 13/4009 711/159 |
| 2008/0005544 A1* | 1/2008 | Jourdan | G06F 9/3802 712/239 |
| 2009/0178060 A1 | 7/2009 | Winter et al. | |
| 2012/0108224 A1* | 5/2012 | Cheng | H04W 52/0277 455/418 |

FOREIGN PATENT DOCUMENTS

| | | |
|---|---|---|
| JP | 2003-209553 A | 7/2003 |
| JP | 2003-273953 A | 9/2003 |
| JP | 2005-071324 A | 3/2005 |
| JP | 2007-183738 A | 7/2007 |
| JP | 4897884 A | 3/2012 |
| WO | 2008/027615 A1 | 3/2008 |

OTHER PUBLICATIONS

Anonymous, "Identifier—Wikipedia", Apr. 21, 2012, Retrieved from the Internet: URL:https://en.wikipedia.org/w/index.php?title=Identifier&oldid=488538983 [retrieved on Sep. 5, 2018] (6 pages total).

* cited by examiner

COMMUNICATION DEVICE FOR SWITCHING STACKS AND METHOD OF CONTROLLING EXECUTION OF STACKS

CROSS REFERENCE TO RELATED APPLICATIONS

This application is a National Stage of International Application No. PCT/JP2013/064882 filed May 29, 2013, claiming priority based on Japanese Patent Application No. 2012-123139, filed May 30, 2012, the contents of all of which are incorporated herein by reference in their entirety.

TECHNICAL FIELD

The present invention relates to a communication device.

The present application claims priority based on Japanese patent application 2012-123139, filed on May 30, 2012 and includes herein by reference the content thereof.

BACKGROUND ART

Conventionally, in order to achieve a high level of automated operation in a plant, a factory, or the like, a distributed control system (DSC) has been implemented, in which on-site devices such as measuring instruments and actuators, which are referred to as field devices are connected via a communication means to controllers that controls the field devices. Although the communication system that forms the base of such a distributed control system had been almost always one that communicates by cable, recent years have seen the appearance of ones that communicate wirelessly, in conformance with an industrial communication standard such as ISA100.11a or WirelessHART (registered trademark).

The above-noted ISA100 is a wireless communication standard used in measurement, control, or the like in a plant or the like and was established by the ISA (International Society of Automation). In contrast, the above-noted WirelessHART is a wireless communication standard put forward by the HART (Highway Addressable Remote Transducer) Communication Foundation in the US as the base of a sensor network (a wireless network enabling collection of environmental or physical conditions by wireless terminals having a plurality of sensors spatially distributed and acting in concert).

In Patent Reference 1 noted below, art is disclosed that mutually connects a wireless sensor network conforming to ZigBee (registered trademark), which is a wireless standard for near-field and low-power consumption communication, and an IP network, which is a network of computers mutually connected using the IP (Internet Protocol). Specifically, in Patent Reference 1 noted below, by providing a gateway having a protocol stack implementing communication via a wireless sensor network conforming to ZigBee and a protocol stack implementing communication via the IP network, these networks are mutually connected.

PRIOR ART REFERENCE

Patent Reference

Patent Reference 1 Japanese Patent No. 4897884

SUMMARY OF THE INVENTION

Problem to be Solved by the Invention

A computer connected to the above-described IP network often has a CPU (central processing unit) having a high processing capability and a large-capacity memory or the like. Such a computer has a plurality of application programs and a plurality of programs implementing communication protocols embedded therein and can, in addition to running a plurality of applications in parallel, switch the communication protocol used for each application.

In contrast, because the above-described field device or a device used in the above-described sensor network is required to operate energy-efficiently, it is often configured with the minimum required hardware. Specifically, the configuration often adopted is one of a CPU having a processing capacity enabling execution of a specific application and communication by a specific communication protocol and a memory having a capacity enabling execution of programs implementing the application and the communication protocol.

Because a device required to operate energy-efficiently adopts a minimum required hardware configuration, it is not easy to implement a plurality of functions simultaneously using one device. If a plurality of functions is to be implemented using a device required to operate energy-efficiently, it is necessary to provide as many pieces of equipment in which an application for implementing each function and a program for implementing communication protocols are combined as the number of functions to be implemented, resulting in an increased cost.

One aspect of the present invention provides a communication device capable of implementing a plurality of functions communicating in conformance with different communication standards while performing energy-efficient operation.

Means for Solving the Problem

The communication device according to one aspect of the present invention is capable of communicating in conformance with a plurality of communication standards, and has a storage storing a plurality of virtual stacks in each of which an application program that implements functionality of the communication device and a communication program that implements a protocol stack for communication by the application program are associated, an executor configured to execute the virtual stacks, and a switching controller configured to switch the virtual stacks to be executed in the executor by performing a first processing in which at least one part of at least one of the virtual stacks is read from the storage and stored into a memory of, and executed by, the executor, and then, in accordance with free capacity in the memory, deleting from the memory at least one part of at least the one of the virtual stacks executed in the first processing, and performing a second processing in which at least one part of at least one of the virtual stacks is read from the storage and stored into the memory of, and executed by, the executor.

In the communication device according to the one aspect of the present invention, each of the virtual stacks has parameters used in at least one of the application programs and the communication program.

The communication device according to the one aspect of the present invention further has a switching table in which information indicating virtual stacks that are objects to be switched is established beforehand. When an event occurring outside or inside of the communication device is input, the switching controller switches the virtual stacks, based on the event, by referencing the switching table.

The communication device according to the one aspect of the present invention further has a timer. The switching controller switches the virtual stacks based on a time measured by the timer.

The communication device according to the one aspect of the present invention further has a switching rule pre-establishing a rule requiring switching. The switching controller recognizes the state of the communication device and switches the virtual stacks by referencing the switching rule.

In the communication device according to the one aspect of the present invention, the switching rule establishes the communication device going into the state of experiencing communication difficulty, the remaining amount of life of a battery provided in the communication device having fallen below a prescribed amount, and the communication device going into the state of starting or restarting. When the switching controller detects that the communication device has gone into a state established in the switching rule, the switching controller switches the virtual stacks.

In the communication device according to the one aspect of the present invention, the executor has an information holding area that holds information passed between the virtual stack to be executed in the first processing and the virtual stack to be executed in the second processing.

In the communication device according to the one aspect of the present invention, the virtual stack to be executed in the first processing is divided into a first part including a program that transmits and receives data via the protocol stack and a second part including a program that implements at least the pre-processing or post-processing of data. The switching controller is configured to switch the first and second parts so as to successively execute the first part and the second part in the executor.

The communication device according to the one aspect of the present invention further has a plurality of communication interfaces. Each of the plurality of virtual stacks includes identifying information that identifies a communication interface used in communication among the plurality of the communication interfaces.

In the communication device according to the one aspect of the present invention, if, after the first processing is performed, the switching controller verifies that at least the one part of the virtual stack to be executed in the second processing is not stored into the memory of the executor and also that there is no free capacity in the memory to store at least the one part of the virtual stack to be executed in the second processing, the switching controller performs the deletion processing.

In the communication device according to the one aspect of the present invention, if, after the first processing is performed, the switching controller verifies that at least the one part of the virtual stack to be executed in the second processing is not stored into the memory of the executor and also that there is free capacity in the memory to store at least the one part of the virtual stack to be executed in the second processing, the switching controller does not perform the deletion processing.

The method of controlling the execution of stacks in a communication device capable of communicating in conformance with a plurality of communication standards according to one aspect of the present invention has a step of performing a first processing whereby at least one part of at least one of a plurality of virtual stacks is stored into a memory of, and executed by, the executor of the communication device, a step, after performing the first processing, of judging a condition for switching the virtual stack to be executed in the executor, a step of, if it is judged that the switching condition is satisfied, deleting at least one part of at least the one of the virtual stacks that has been executed in the first processing from the memory, in accordance with free capacity of the memory, and a step of, after deleting from the memory at least the one part of at least the one of the virtual stacks that has been executed in the first processing in accordance with free capacity of the memory, performing a second processing, whereby at least one part of at least one of the virtual stacks is stored into the memory of, and executed by, the executor. Each of the plurality of the virtual stacks includes an application program that implements functionality of the communication device and a communication program that implements a protocol stack for communication by the application program.

In the method of controlling the execution of stacks according to the one aspect of the present invention, the step of judging a condition for switching the virtual stack to be executed in the executor, based on an event occurring outside or inside of the communication device, judges the switching condition by referencing pre-configured switching information.

In the method of controlling the execution of stacks according to the one aspect of the present invention, the step of judging a condition for switching the virtual stack to be executed in the executor judges the switching condition based on a time or the virtual stack execution time.

In the method of controlling the execution of stacks according to the one aspect of the present invention, the step of judging a condition for switching the virtual stack to be executed in the executor, based on the state of the communication device, judges the switching condition by referencing a pre-configured switching rule.

In the method of controlling the execution of stacks according to the one aspect of the present invention, the switching rule establishes the communication device going into the state of experiencing communication difficulty, the remaining amount of life of a battery provided in the communication device having fallen below a prescribed amount, and the communication device going into the state of starting or restarting. When detecting that the communication device has gone into a state established in the switching rule, the step of judging a virtual stack switching condition to be executed in the executor judges that the virtual stack switching condition is satisfied.

In the method of controlling the execution of stacks according to the one aspect of the present invention, the step of deleting from the memory at least the one part of at least the one of the virtual stacks that has been executed in the first processing in accordance with free capacity of the memory, performs the deleting processing when at least the one part of at least the one of the virtual stacks to be executed in the second processing is not stored into the memory of the executor and also there is no free capacity in the memory to store at least the one part of at least the one of the virtual stacks to be executed in the second processing.

In the method of controlling the execution of stacks according to the one aspect of the present invention, the step of deleting from the memory at least the one part of at least the one of the virtual stacks that has been executed in the first processing in accordance with free capacity of the memory, does not perform the deletion processing when at least the one part of at least the one of the virtual stacks to be executed in the second processing is not stored into the memory of the executor and also there is free capacity in the memory to store at least the one part of at least the one of the virtual stacks to be executed in the second processing.

Effect of the Invention

Because one aspect of the present invention executes, in an executor under the control of a switching controller, either one of a first virtual stack in which a first application program and a first communication program that implements a first protocol stack are associated and a second virtual stack in which a second application program and a second communication program that implements a second protocol stack are associated, it is possible to implement a plurality of functions communicating in conformance with different communication standards while performing energy-efficient operation.

DESCRIPTION OF EMBODIMENTS

A communication device according to an embodiment of the present invention will be described in detail below, with references made to the drawings.

First Embodiment

Figure 1:
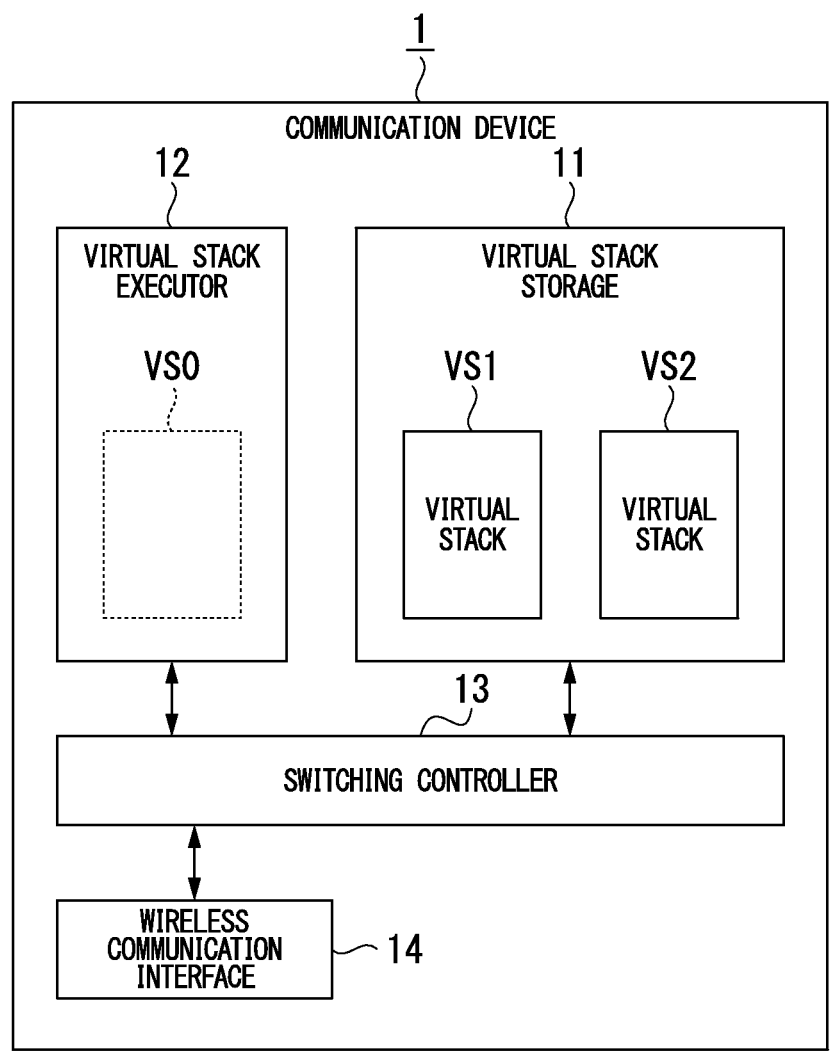
FIG. 1 is a block diagram showing the main parts of the constitution of a communication device according to a first embodiment of the present invention.

FIG. 1 is a block diagram showing the main parts of the constitution of a communication device according to the first embodiment of the present invention. As shown in FIG. 1, a communication device 1 of the first embodiment has a virtual stack storage 11 (storage), a virtual stack executor 12 (executor), a switching controller 13, and a wireless communication interface 14, and can communicate in conformance with a plurality of wireless communication standards. For example, the communication device 1 is a field device capable of wirelessly communicating in conformance with ISA100.11a, which is an industrial wireless communication standard, and WirelessHART (Registered Trademark), while performing energy-efficient operation.

The virtual stack storage 11 is implemented by a non-volatile memory such as a flash ROM (read-only memory) or an EEPROM (electrically erasable and programmable ROM), and stores a virtual stack VS1 (first virtual stack) and a virtual stack VS2 (second virtual stack) used in the communication device 1. In the virtual stacks VS1 and VS2, an application program that implements the functionality of the communication device 1 and a communication program that implements a protocol stack for communication by the application program are associated.

Figure 2:
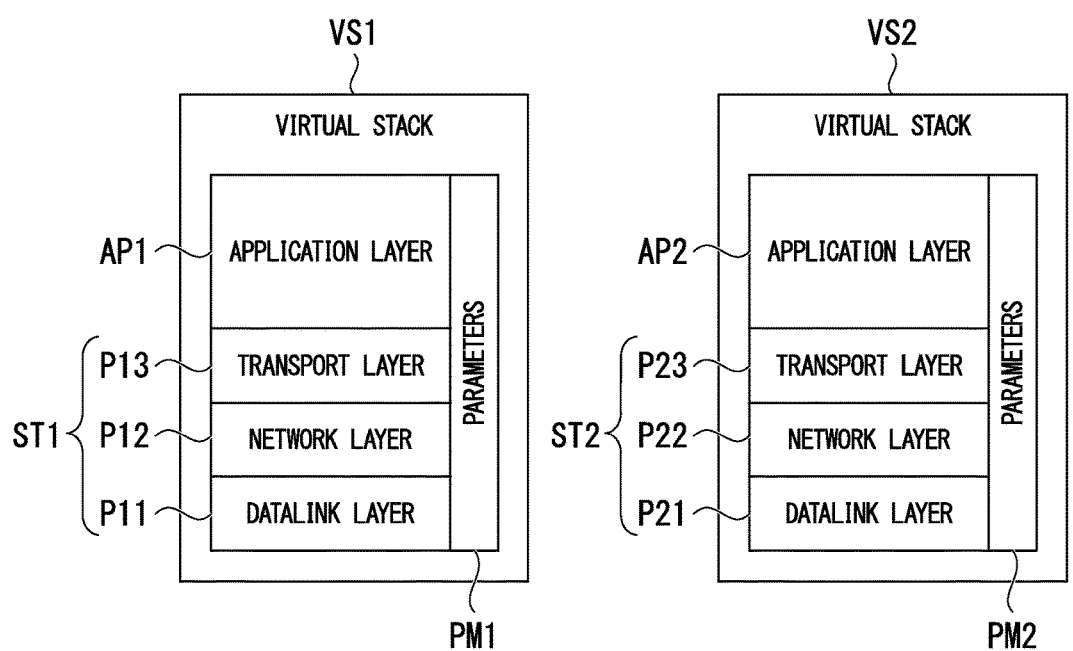
FIG. 2 is a drawing showing an example of a virtual stack in the first embodiment of the present invention.

FIG. 2 shows an example of a virtual stack in the first embodiment of the present invention. As shown in FIG. 2, the virtual stack VS1 includes an application program AP1 (first application program) associated with the communication programs P11 to P13 (first communication program), and the parameters PM1. The application program AP1 implements the functions of the communication device 1 (for example, a flow rate measurement function, a temperature measurement function, and other functions).

The communication programs P11 to P13 implement a protocol stack ST1 (first protocol stack) conforming to the above-noted ISA100.11a wireless communication standard. Specifically, the communication program P11 implements a data-link layer of the protocol stack ST1, the communication program P12 implements a network layer of the protocol stack ST1, and the communication program P13 implements a transport layer of the protocol stack ST1.

More specifically, the communication program P11 implements a data-link layer established by the IEEE 802.15.4 wireless communication standard. The communication program P12 implements a network layer established by IPv6, which is a type of Internet protocol. The communication program P13 implements a UDP (user datagram protocol) established by the Internet protocol as a transport layer.

The parameters PM1 are used in at least one of the application program AP1 and the communication programs P11 to P13. The parameters PM1 include, as parameters used in the application program AP1, for example, key information used in encryption processing, information indicating an encryption algorithm, information indicating the units of a measured flow rate or temperature, or the like. In addition, the parameters PM1 include, as parameters used in the communication programs P11 to P13, information indicating the transmission destination and transmission source of data, information (subnet ID) for identifying a communication network, or the like.

In contrast, the virtual stack VS2 includes an application program AP2 (second application program) associated with the communication programs P21 to P23 (second communication program), and parameters PM2. The application program AP2 implements the functionality of the communication device 1, similar to application program AP1. The functions implemented by the application program AP2 may be either the same as or different from those implemented by application program AP1.

The communication programs P21 to P23 implement a protocol stack ST2 (second protocol stack) conforming to the above-noted wireless communication standard WirelessHART (registered trademark). Specifically, the communication program P21 implements a data-link layer of the protocol stack ST2, the communication program P22 implements a network layer of the protocol stack ST2, and the communication program P23 implements a transport layer of the protocol stack ST2.

The parameters PM2 are used in at least one of the application program AP2 and the communication programs P21 to P23. The parameters PM2 include, similar to the parameters PM1, as parameters used in the application program AP2, for example, key information used in encryption processing, information indicating an encryption algorithm, information indicating the units of a measured flow rate or temperature, or the like, and include, as parameters used in the communication programs P21 to P23, information indicating the transmission destination and transmission source of data, information (subnet ID) for identifying a communication network, or the like.

For simplifying the description of the present first embodiment, the case of storing two virtual stacks VS1 and VS2 into the virtual stack storage 11 will be described as an example. However, to the extent that the capacity of the virtual stack storage 11 permits, the virtual stack storage 11 can store the arbitrary number of virtual stacks.

The virtual stack executor 12 successively executes the virtual stack VS1 and VS2 that had been stored in the virtual stack storage 11. The virtual stack executor 12 is implemented by a CPU (central processing unit) and a volatile memory such as a RAM (random-access memory) or the like, and executes a virtual stack read from the virtual stack storage 11 under the control of the switching controller 13 as it is stored in the volatile memory. The capacity of the volatile memory constituting a part of the virtual stack executor 12 is set to a capacity capable of executing the virtual stacks VS1 and VS2. In FIG. 1, as an aid to understanding, the virtual stack read into the virtual stack executor 12 is expressed as being the virtual stack VS0 shown by the broken line.

Figure 3A:
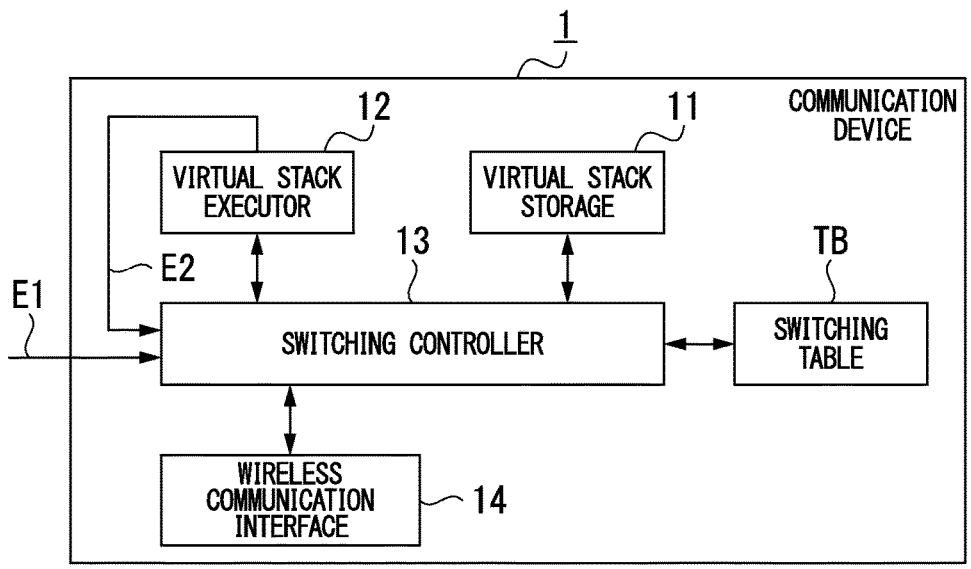
FIG. 3A is a drawing for describing the virtual stack switching conditions in the first embodiment of the present invention.
Figure 3B:
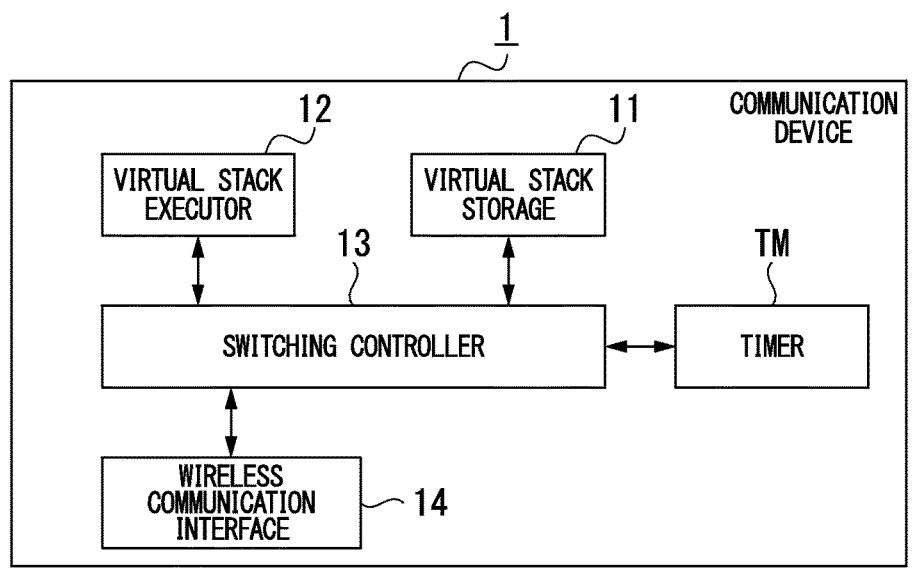
FIG. 3B is a drawing for describing the virtual stack switching conditions in the first embodiment of the present invention.
Figure 3C:
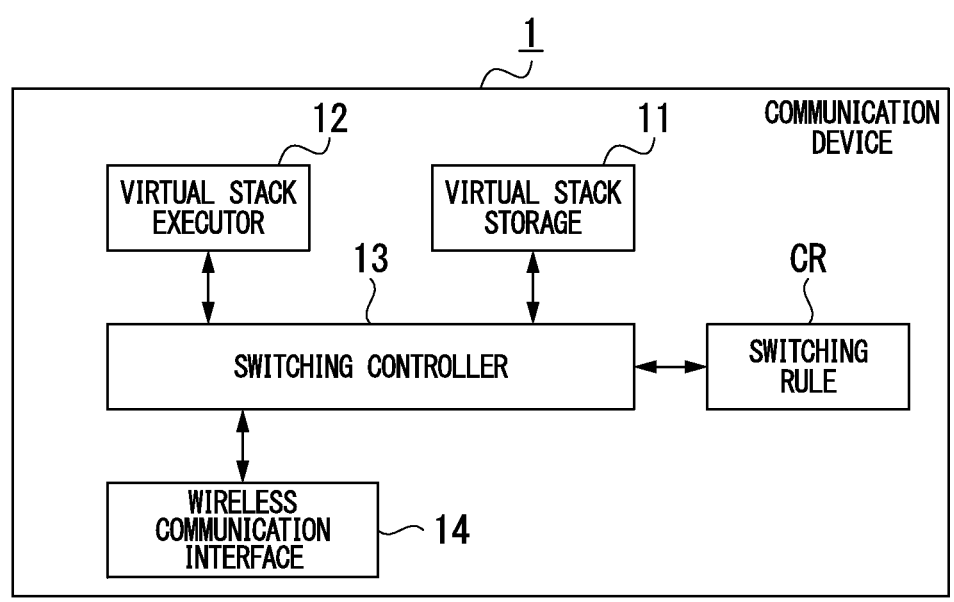
FIG. 3C is a drawing for describing the virtual stack switching conditions in the first embodiment of the present invention.

The switching controller 13 switches the virtual stack that the virtual stack execution unit 12 is caused to execute between the virtual stacks VS1 and VS2. For example, the switching control unit 13 switches the virtual stack that the virtual stack execution unit 12 is caused to execute between the virtual stacks VS1 and VS2, based on an event occurring outside or inside of the communication device 1, the time, or the status of the communication device 1 (context). FIG. 3A to FIG. 3C are drawings for describing the virtual stack switching conditions in the first embodiment of the present invention, FIG. 3A being a drawing for describing a case in which an event occurred outside or inside of the communication device 1 is the switching condition, FIG. 3B being a drawing for describing a case in which the time is the switching condition, and FIG. 3C being a drawing for describing a case in which the status of communication device 1 is the switching condition.

As shown in FIG. 3A, when the event E1 occurring outside or the event E2 occurring inside of the communication device 1 is the switching condition, the switching controller 13 references a switching table TB (table in which information indicating targeted virtual stacks to be switched for each type of the events E1 and E2 is established beforehand) to switch the virtual stacks VS1 and VS2. The event E1, for example, is an event for giving notification of the measurement results, such as a flow rate or temperature, and the event E2, for example, is an event for giving notification of the communication results performed by the virtual stack being executed in the virtual stack executor 12.

There are cases in which the switching controller 13 switches the virtual stacks VS1 and VS2 without referencing the switching table TB. For example, when only two virtual stacks VS1 and VS2 are stored in the virtual stack storage 11 and the events E1 and E2 occur, when it is without a doubt necessary to switch the virtual stack (for example, the virtual stack VS1) executed in the virtual stack executor 12 to the virtual stack (for example, the virtual stack VS2) not being executed, it is possible to omit referencing of the switching table TB.

As shown in FIG. 3B, if the time is the switching condition, the switching controller 13 references the time measured by the timer TM to switch the virtual stacks VS1 and VS2. For example, if the time reaches the pre-configured time, or if the virtual stack execution time in the virtual stack executor 12 exceeds the pre-configured time, the switching controller 13 switches the virtual stacks VS1 and VS2. In the example shown in FIG. 3B, although the timer TM is provided external to the switching controller 13, the timer TM may be provided internal to the switching controller 13.

As shown in FIG. 3C, if the status of the communication device 1 is the switching condition, the switching controller 13 recognizes the state of the communication device 1 and switches the virtual stacks VS1 and VS2, while referencing the pre-configured switching rule CR. The switching rule CR establishes a rule requiring the switching of the virtual stacks VS1 and VS2. This switching rule CR establishes that, for example, only when a specific virtual stack is being used the communication device 1 has gone into the state of experiencing communication difficulty, the remaining amount of life of a battery provided in the communication device 1 has fallen below a prescribed amount, or the communication device 1 has gone into the state of starting or restarting and the like.

The wireless communication interface 14 receives data transmitted as a wireless signal from outside of the communication device 1 and transmits data to be transmitted outside the communication device 1 as a wireless signal. The wireless communication interface 14 corresponds to a physical layer as established in, for example, the IEEE 802.15.4 wireless communication standard.

Figure 4:
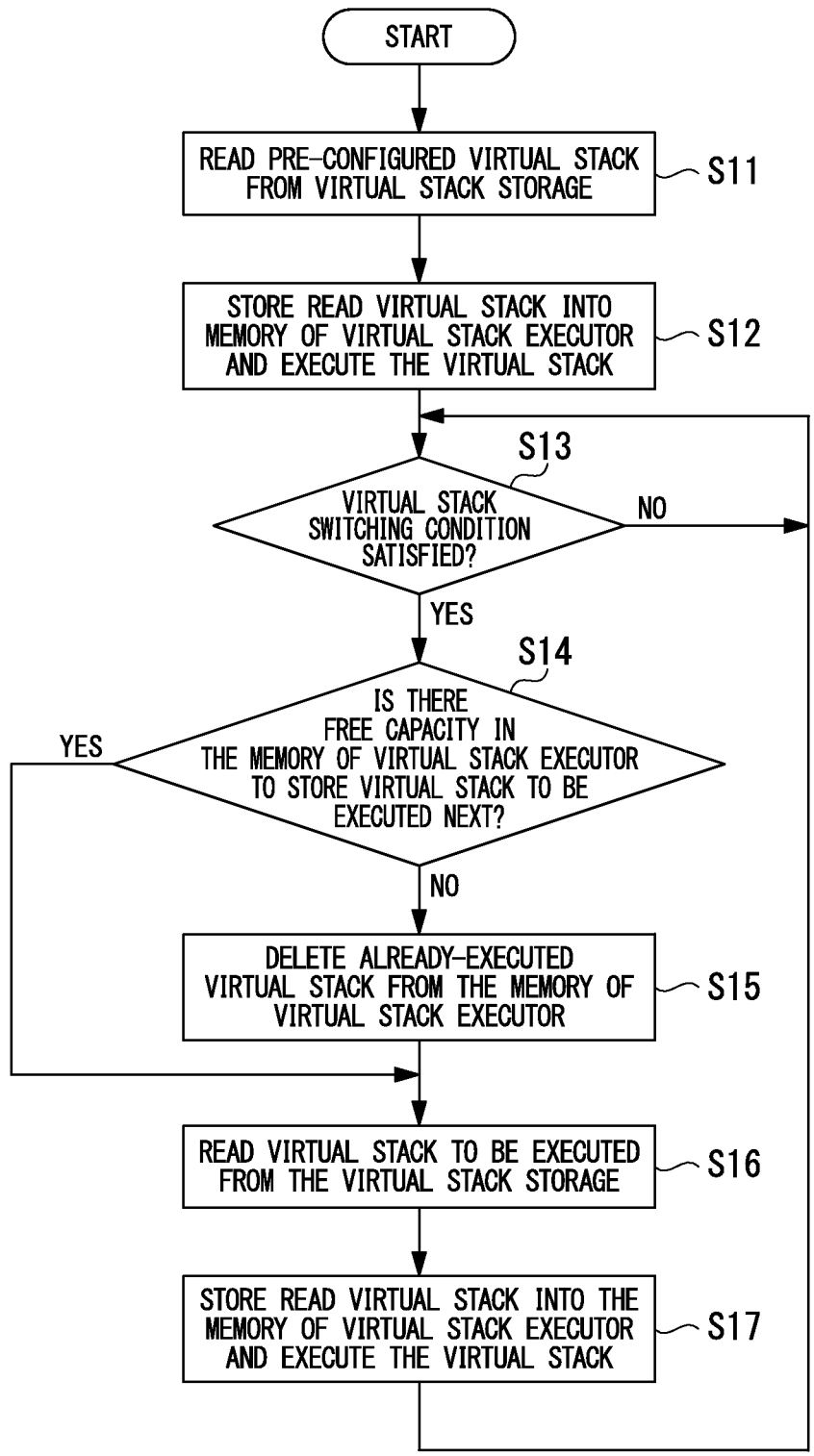
FIG. 4 is a flowchart showing operation in a communication device according to the first embodiment of the present invention.

Next, the operation of the communication device 1 having the above-noted constitution will be generally described. FIG. 4 is a flowchart showing operation in the communication device according to the first embodiment of the present invention. The flowchart shown in FIG. 4 starts by switching the electrical power to the communication device 1 on and starting the communication device 1. First, when the communication device 1 starts up, the switching controller 13 reads the pre-configured (default) virtual stack from the virtual stack storage 11 (step S11). In the present first embodiment, the virtual stack VS1 is read.

The virtual stack VS1 read from the virtual stack storage 11 is stored into the memory of the virtual stack executor 12 by the switching controller 13 and executed (step S12). This implements the protocol stack ST1 shown in FIG. 2 and the functions of the communication device 1 by the application program AP1 (for example, a flow rate measurement function, a temperature measurement function, and other functions), and the communication device 1 goes into the state enabling wireless communication in conformance with ISA100.11a wireless communication standard as described above.

After completion of the above processing, the switching controller 13 judges whether or not the condition for switching of the virtual stack is satisfied (step S13). For example, as shown in FIG. 3A, if an event E1 occurring outside or an event E2 occurring inside the communication device 1 is the switching condition, a judgment is made as to whether or not the event E1 or the event E2 is input to the switching controller 13. As shown in FIG. 3B, if a time is the switching condition, the switching controller 13 refers the timer TM and judges whether or not the time has reached the pre-configured time, or the virtual stack VS1 execution time executed in the virtual stack executor 12 has exceeded the pre-configured time. Alternatively, as shown in FIG. 3C, if the status of the communication device 1 is the switching condition, the switching controller 13 references the switching rule CR and judges whether or not the status of the communication device 1 is the status established by the switching rule CR.

If the judgment is made that the condition for switching of the virtual stack has not been satisfied (NO judgment result at step S13), the switching controller 13 repeats the judgment at step S13. In contrast, if the judgment is made that the condition for switching of the virtual stack has been satisfied (YES judgment result at step S13), a verification is made of whether or not there is free capacity in the memory of the virtual stack executor 12 to store the virtual stack that is to be executed next (switched) (step S14). In the present embodiment 1, next, the virtual stack to be executed (switched) in the memory of the virtual stack executor 12 is made to be the virtual stack VS2. If there is free capacity in the memory of the virtual stack executor 12 to store the virtual stack VS2 (YES judgment result at step S14), the virtual stack VS2 is read from the virtual stack storage 11, without deleting the virtual stack VS1 from the memory (step S16). If however, there is no free capacity in the memory of the virtual stack executor 12 to store the virtual stack VS2 (NO judgment result at step S14), the virtual stack VS1 is deleted from the memory of the virtual stack executor 12 (step S15), and the virtual stack VS2 is read from the virtual stack storage 11 (step S16).

Next, the switching controller 13 stores the virtual stack VS2 that has been read from the virtual stack storage 11 into the memory of the virtual stack executor 12 and executes the virtual stack VS2 (step S17). This implements the protocol stack ST shown in FIG. 2 and the functionality of the communication device 1 by the application program AP2, and places the communication device 1 into a state enabling wireless communication conforming to the above-noted wireless communication standard WirelessHART (registered trademark). Subsequently, the processing of steps S13 to S17 is repeated.

As described above, the communication device 1 of the first embodiment is configured to store the virtual stacks VS1 and VS2 in which an application program and a communication program implementing a protocol stack that is required for performing a communication by the application program are associated into the virtual stack storage 11, and to switch by the switching controller 13 the virtual stacks VS1 and VS2 that are to be executed in the virtual stack executor 12. For this reason, even if the communication device 1 has a minimum required hardware configuration so as to operate with energy efficiency, it is possible to implement a plurality of functions communicating in conformance with different communication standards while performing energy-efficient operation.

Second Embodiment

Figure 5:
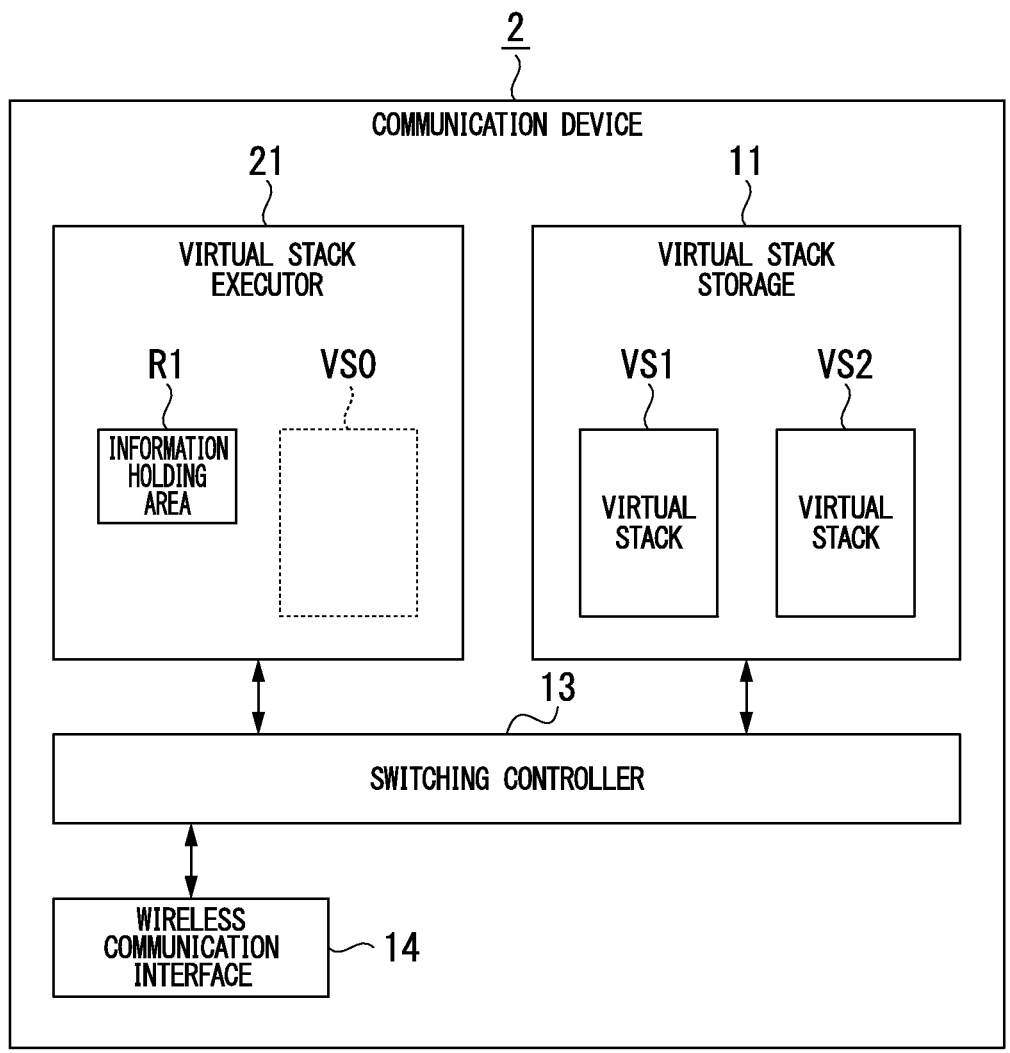
FIG. 5 is a block diagram showing the main parts of the constitution of a communication device according to a second embodiment of the present invention.

FIG. 5 is a block diagram showing the main parts of the constitution of a communication device according to the second embodiment of the present invention. As shown in FIG. 5, a communication device 2 of the second embodiment has a virtual stack storage 21 in place of the virtual stack executor 12 provided in the communication device 1 shown in FIG. 1. The virtual stack storage 21, similar to the virtual stack executor 12 shown in FIG. 1 successively executes the virtual stacks VS1 and VS2, it further has an information holding area R1 that holds information passed between the virtual stacks executed in the virtual stack executor 21. By providing the information holding area R1, it is possible to smoothly pass information between the virtual stacks VS1 and VS2 switched by the switching controller 13.

Figure 6:
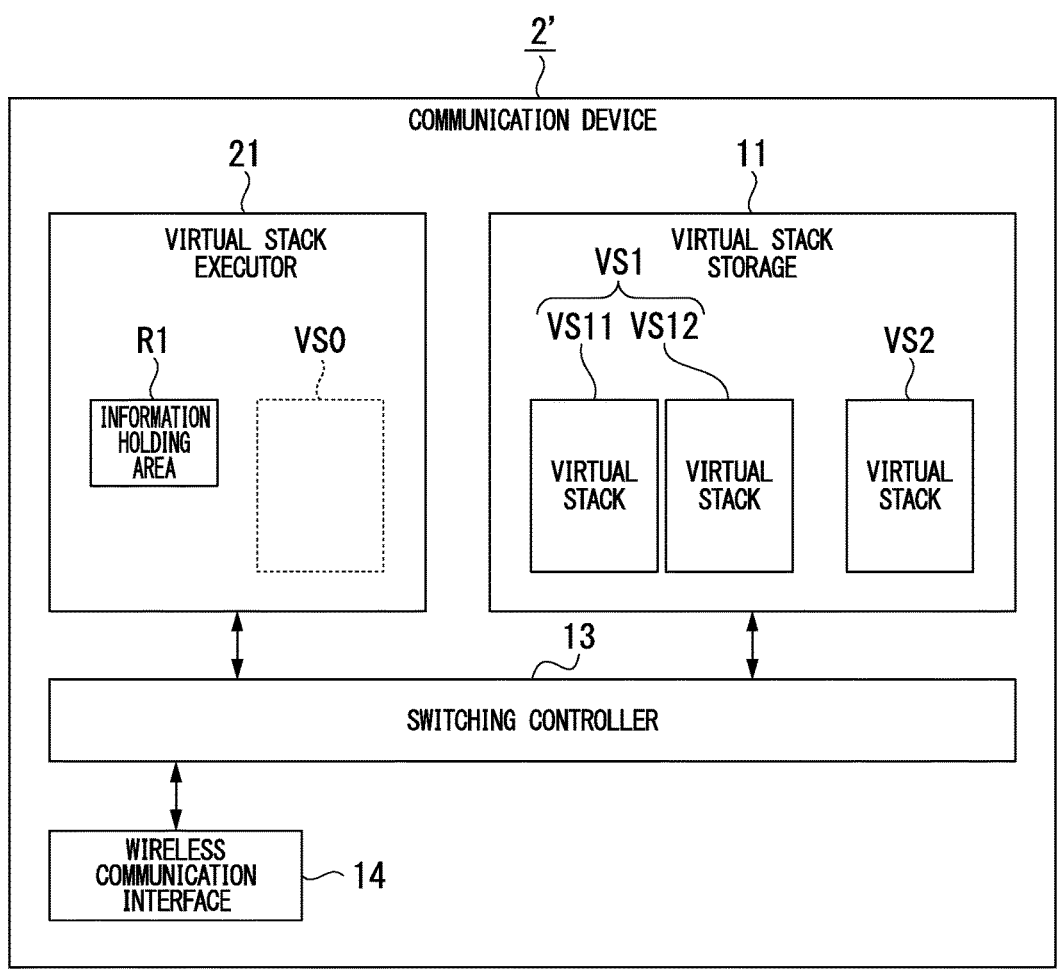
FIG. 6 is a block diagram showing the main parts of the constitution of a communication device according to an application example of the second embodiment of the present invention.

FIG. 6 is a block diagram showing the main parts of the constitution of a communication device according to an application example of the second embodiment of the present invention. As shown in FIG. 6, the communication device 2' of the present application example, similar to the communication device 2 shown in FIG. 5, is constituted to have the virtual stack storage 11, the virtual stack executor 21, the switching controller 13, and the wireless interface 14. However, the communication device 2' of the present application example is different from the communication device 2 shown in FIG. 5 regarding the virtual stack VS1 stored in the virtual stack storage 11.

Specifically, the virtual stack VS1 stored in the virtual stack storage 11 of the communication device 2 shown in FIG. 5, as shown in FIG. 2, includes an application program AP1 associated with the communication programs P11 to P13, and the parameters PM1. In contrast, the virtual stack VS1 stored in the virtual stack storage 11 of the communication device 2' shown in FIG. 6 is divided into a virtual stack VS11 (the first part) and a virtual stack VS12 (the second part). The virtual stack VS1 is divided into the virtual stacks VS11 and VS12 so that execution of the application program AP1 is possible even if the size of the application program AP1 included in the virtual stack VS1 is a size that cannot be executed by the communication device 2'.

Figure 7:
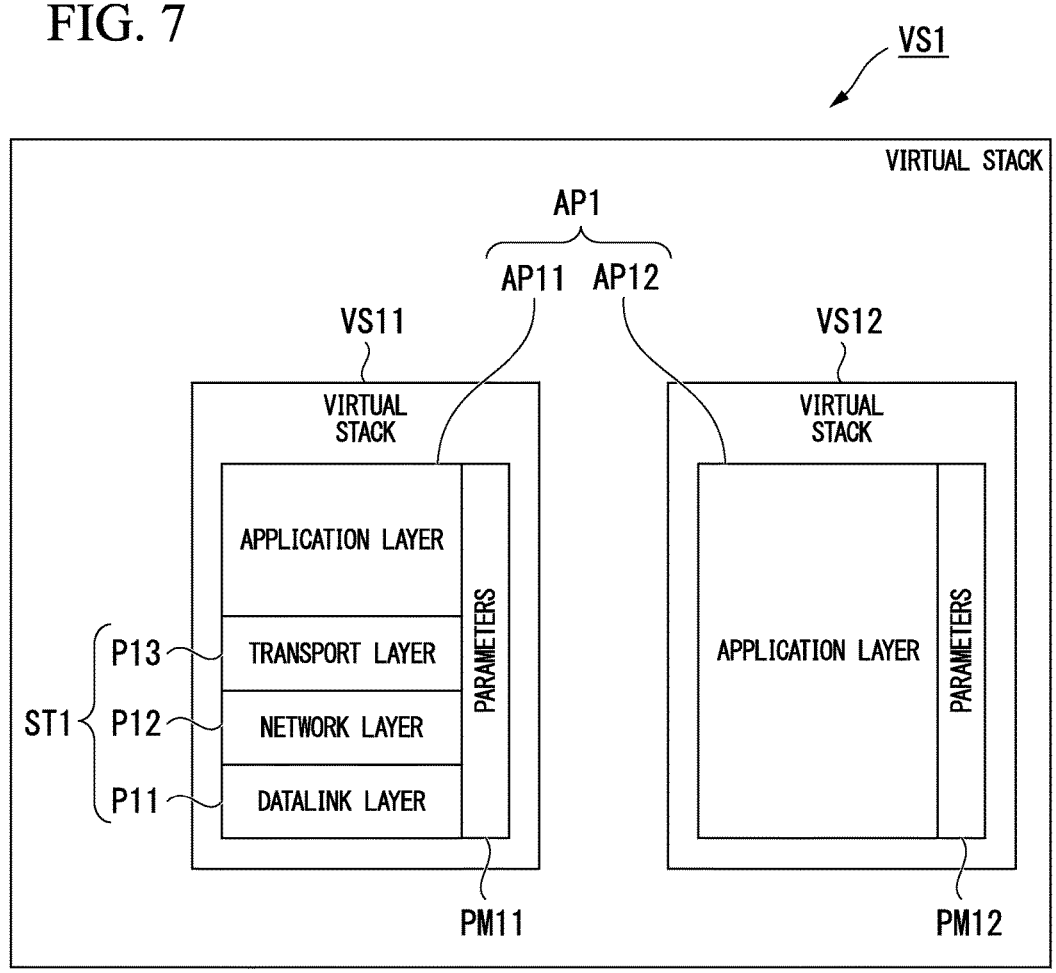
FIG. 7 is a drawing showing an example of a virtual stack in the application example of the second embodiment of the present invention.

FIG. 7 shows an example of the virtual stack VS1 in the application example of the second embodiment of the present invention. As shown in FIG. 7, the virtual stack VS11 that serves as a part of the virtual stack VS1 includes the communication programs P11 to P13, the application program AP11, and the parameters PM11. The communications programs P11 to P13 are the same as those shown in FIG. 2, and are programs that implement the protocol stack ST1 conforming to the ISA100.11a wireless communication standard.

The application program AP11 of the application program AP1 transmits and receives data via the protocol stack ST1. The parameters PM11 are used in at least one of the application program AP11 and the communication programs P11 to P13, and includes, for example, information indicating the transmission destination and transmission source of data and information (subnet ID) for identifying a communication network.

In contrast, the virtual stack VS12 that constitutes the remaining part of the virtual stack VS1 includes the application program AP12 and the parameters PM12. The application program AP12 is the remaining part of the application program AP1, which excludes the application program AP11. For example, the application program AP12 implements the pre-processing of data to be transmitted via the protocol stack ST1, the post-processing of data received via the protocol stack ST1, and the functions of the communication device 2' (for example, a flow rate measurement function, a temperature measurement function, and other functions). The pre-processing includes encryption processing, but may include other processing. The post-processing includes decryption processing, but may include other processing. The parameters PM12 are used when the application program AP12 is executed, these being, for example, key information used in encryption processing, information indicating an encryption algorithm, and information indicating the units of a measured flow rate or temperature.

In the application example, although the application program AP1 is described as being divided into the application program AP11, which receives and transmits data via the protocol stack ST1, and the application program AP12, which is the remaining part of the application program, the application program AP1 may be divided in an arbitrary manner. However, neither a state in which the virtual stacks VS11 and VS12 cannot be executed nor one in which the processing by the communication device 2' (for example, data receiving and transmission processing) is hindered may occur. For example, the application program AP1 may be divided into three or more programs.

The virtual stack executor 21 of the communication device 2 shown in FIG. 5 successively executes the virtual stacks VS1 and VS2 that had been stored in the virtual stack storage 11, as similar to the virtual stack executor 12 of the communication device 1 shown in FIG. 1. In contrast, the virtual stack executor 21 of the communication device 2' shown in FIG. 6 can successively execute the virtual stacks VS11, VS12 and the VS2.

The switching controller 13 provided in the communication device 2' can switch the virtual stacks VS11, VS12, and VS2 that are executed in the virtual stack executor 21. Specifically, if an event E2 occurring within the communication device 2' (specifically, an event output from the virtual stack VS0 executed in the virtual stack executor 21) is input, the switching controller 13, similar to the case described in FIG. 3A, switches between the virtual stack VS11 and the virtual stack VS12 as the virtual stack executed in the virtual stack executor 21.

For example, if data is to be transmitted from outside the communication device 2' by wireless communication conforming to the ISA100.11a wireless communication standard, the switching controller 13 reads the virtual stack VS11 from the virtual stack storage 11 and has it executed in the virtual stack executor 21. Next, when an event E2 indicating that receiving processing has been completed is output from the virtual stack VS11 (virtual stack VS0), the switching controller 13 switches the virtual stack to be executed in the virtual stack executor 21 from the virtual stack VS11 to the virtual stack VS12 and causes the virtual stack VS12 to perform decryption processing (post-processing) of the data that had been subjected to receiving processing.

Also, for example, if data is to be transmitted to outside the communication device 2' by wireless communication conformation to the ISA100.11a wireless communication standard, the switching controller 13 reads the virtual stack VS12 from the virtual stack storage 11 and has it executed in the virtual stack executor 21 to perform encryption processing (pre-processing). Next, when an event E2 indicating that the encryption processing has been completed is output from the virtual stack VS12 (virtual stack VS0), the switching controller 13 switches the virtual stack to be executed in the virtual stack executor 21 from the virtual stack VS12 to the virtual stack VS11 and causes the virtual stack VS11 to perform transmission processing of the data that had been subjected to encryption processing.

Additionally, if the state of the virtual stack VS12 (virtual stack VS0) executed by the virtual stack executor 21 has become indeterminate (for example, if a watchdog timer detects a problem), the switching controller 13 always causes the virtual stack VS11, which includes the communication programs P11 to P13 implementing the protocol stack ST1, to be executed by the virtual stack executor 21. This is done, for example, in order to perform a remote reset of a problem occurring during execution of the virtual stack VS12, so that the communication device 2' is placed in a state in which it can communicate. If remote resetting of a problem occurring in the communication device 2' is possible in this manner, the need for a worker to go to the installation location of the communication device 2' and perform a reset is eliminated, thereby enabling a quick resetting of the communication device 2'.

Next, the operation of the communication device 2' having the above-noted constitution will be generally described. In the following, the operation of receiving data that was transmitted from outside the communication device 2' by a wireless communication in conformance with ISA100.11a wireless communication standard (receiving operation) and the operation of transmitting data to outside the communication device 2' by a wireless communication in conformance with the ISA100.11a wireless communication standard (transmitting operation) will be described by examples. The communication device 2' will be assumed to perform intermittent operation by a pre-configured schedule, so as to reduce the power consumption. For this reason, the communication device 2' performs transmission operation at a pre-configured timing and performs receiving operation at a pre-configured timing differing from the timing of the transmission operation.

(Receiving Operation)

Figure 8:
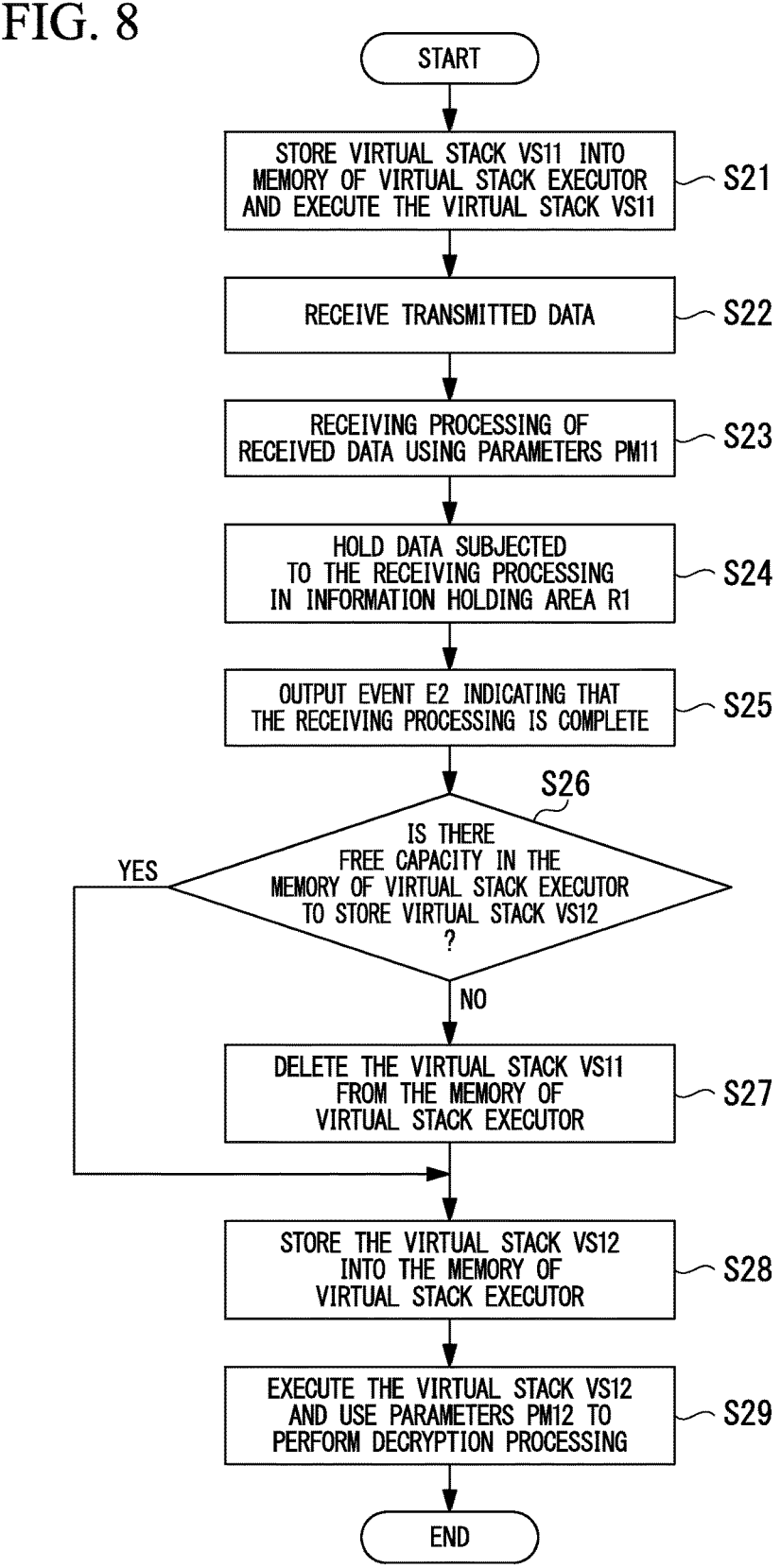
FIG. 8 is a flowchart showing receiving operation in the communication device according to the application example of the second embodiment of the present invention.

FIG. 8 is a flowchart showing the receiving processing in the communication device according to the application example of the second embodiment of the present invention. When a receiving operation is to be performed, first the switching controller 13 reads the virtual stack VS11 stored in the virtual stack storage 11, stores the stack into the memory of the virtual stack executor 12, and executes the stack (step S21). By doing this, the communication device 2' implements the protocol stack ST1 shown in FIG. 7 and the functions of transmitting and receiving data via the protocol stack ST1 (functions of the application program AP11).

With the virtual stack VS11 being executed, when data addressed to the communication device 2' is transmitted from outside the communication device 2', the wireless communication interface 14 receives the data (step S22). The data received by the wireless communication interface 14 is output to the virtual stack executor 12, and the virtual stack VS11 executes receiving processing (packet processing or the like) (step S23). The receiving processing by the virtual stack VS11 is performed using the protocol stack ST1 implemented by the communication programs P11 to P13 and using the parameters PM11. Data that has been subjected to receiving processing is held in the information holding area R1 of the virtual stack executor 12 (step S24).

When the receiving processing by the virtual stack VS11 is completed, the event E2 indicating that the receiving processing has been completed is output to the switching controller 13 from the virtual stack VS11 (virtual stack VS0) (step S25). Next, the switching controller 13 verifies whether there is free capacity in the memory of the virtual stack executor 12 to store the virtual stack VS12 (step S26). If there is free capacity in the memory of the virtual stack executor 12 to store the virtual stack VS12 (YES verification result at step S26), without deleting the virtual stack VS11 from the memory, the virtual stack VS12 is read from the virtual stack storage 11 and is stored into the memory of the virtual stack executor 12 (step S28). If, however, there is no free capacity in the memory of the virtual stack executor 12 to store the virtual stack VS12 (NO verification result at step S26), the virtual stack VS11 is deleted from the memory of the virtual stack executor 12 (step S27), and the virtual stack VS12 is read from the virtual stack storage 11 and is stored into the memory of the virtual stack executor 12 (step S28). This switches the virtual stack to be executed in the virtual stack executor 12 from the virtual stack VS11 to the virtual stack VS12. This implements the functions of the application program AP12 as shown in FIG. 7 and performs decryption processing (post-processing) and other processing of data received via the protocol stack ST1 (step S29). In the decryption processing, data held in the information holding area R1 is read by the application program AP12 and the parameters PM12 included in the virtual stack VS12 are used. In this manner, data is received that had been transmitted to the communication device 2'.

The data obtained by the above-noted receiving processing is used, for example, in a function implemented by the application program AP12 (for example, a flow rate measurement function, a temperature measurement function, and other functions). If a problem occurs in the processing of steps S27 to S29, in order to enable, for example, a remote reset of a problem occurring during the execution of the virtual stack VS12, the switching controller 13 switches the virtual stack to be executed in the virtual stack executor 12 from the virtual stack VS12 to the virtual stack VS11.

(Transmission Operation)

Figure 9:
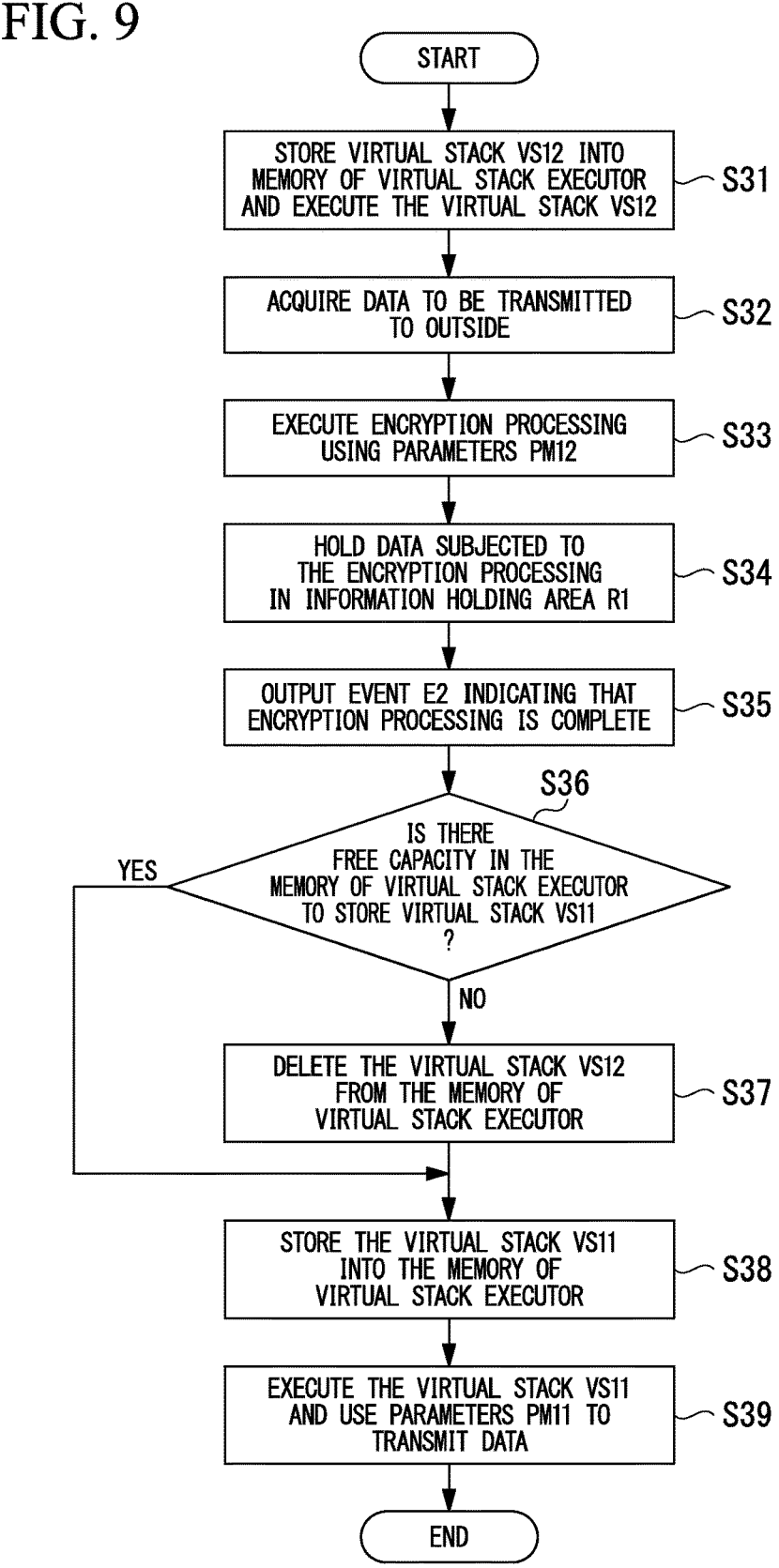
FIG. 9 is a flowchart showing transmitting operation in the communication device according to the application example of the second embodiment of the present invention.

FIG. 9 is a flowchart showing the transmission operation in the communication device according to the application example of the second embodiment of the present invention. When a transmission operation is to be performed, first the switching controller 13 reads the virtual stack VS12 stored in the virtual stack storage 11, stores the stack into the memory of the virtual stack executor 12, and executes the stack (step S31). This implements the functions of the application program AP12 shown in FIG. 7. When the virtual stack VS12 is executed, processing is performed to acquire data to be transmitted to outside (step S32). For example, if the execution of application program AP12 implements a flow rate measurement function in the communication device 2', the flow rate is measured to acquire measured flow rate data, and if it implements a temperature measurement function in the communication device 2', the temperature is measured to acquire measured temperature data.

When data to be transmitted to outside from the communication device 2' is acquired, the data is subjected to encryption processing (pre-processing) by the virtual stack executor 12 (step S33). The encryption processing is performed using the parameters PM12 included in the virtual stack VS12. The encrypted data is held in the information holding area R1 of the virtual stack executor 12 (step S34).

When the encryption processing by the virtual stack VS12 is completed, an event E2 indicating that the encryption processing has been completed is output to the switching controller 13 from the virtual stack VS12 (virtual stack VS0) (step S35). Next, the switching controller 13 verifies whether there is free capacity in the memory of the virtual stack executor 12 to store the virtual stack VS11 (step S36). If there is free capacity in the memory of the virtual stack executor 12 to store the virtual stack VS11 (YES verification result at step S36), the virtual stack VS11 is read from the virtual stack storage 11 and is stored into the memory of the virtual stack executor 12, without deleting the virtual stack VS12 from the memory (step S38). If, however, there is no free capacity in the memory of the virtual stack executor 12 to store the virtual stack VS11 (NO verification result at step S36), the virtual stack VS12 is deleted from the memory of the virtual stack executor 12 (step S37), and the virtual stack VS11 is read from the virtual stack storage 11 and is stored into the memory of the virtual stack executor 12 (step S38). This switches the virtual stack to be executed in the virtual stack executor 12 from the virtual stack VS12 to the virtual stack VS11. This implements the protocol stack ST1 shown in FIG. 7 and the functions of receiving and transmitting data via the protocol stack ST1 (the functions of the application program AP11).

The data encrypted by the virtual stack VS12 is subjected to transmission processing (packet processing or the like) by the virtual stack VS11 in the virtual stack executor 12 (step S39). The transmission processing by the virtual stack VS11 is performed using the protocol stack ST1 implemented by the communication programs P11 to P13 and using the parameters PM11. After transmission processing of the data by the virtual stack VS11 is completed, the data is output to the wireless communication interface 14 from the virtual stack executor 12 and is transmitted as a wireless signal. In this manner, data is transmitted to the outside from the communication device 2'.

If a problem occurs in the processing in of steps S31 to S37, the switching controller 13 switches the virtual stack to be executed by the virtual stack executor 12 from the virtual stack VS12 to the virtual stack VS11. This, similar to the case of the receiving processing, enables, for example, remote resetting of a problem occurring during execution of the virtual stack VS12.

As described above, in this application example, the virtual stack VS1 is divided into the virtual stack VS11 and the virtual stack VS12, and the virtual stack that is executed by the virtual stack executor 12 is switched by the switching controller 13 between the virtual stacks VS11 and VS12. For this reason, the application program AP1 can be executed even if the size of the application program AP1 included in the virtual stack VS1 is a size that cannot be executed by the communication device 2'. Also, similar to the first embodiment, even if the communication device 2' has a minimum required hardware configuration so as to operate with energy efficiency, it is possible to implement a plurality of functions communicating in conformance with different communication standards while performing energy-efficient operation.

Third Embodiment

Figure 10:
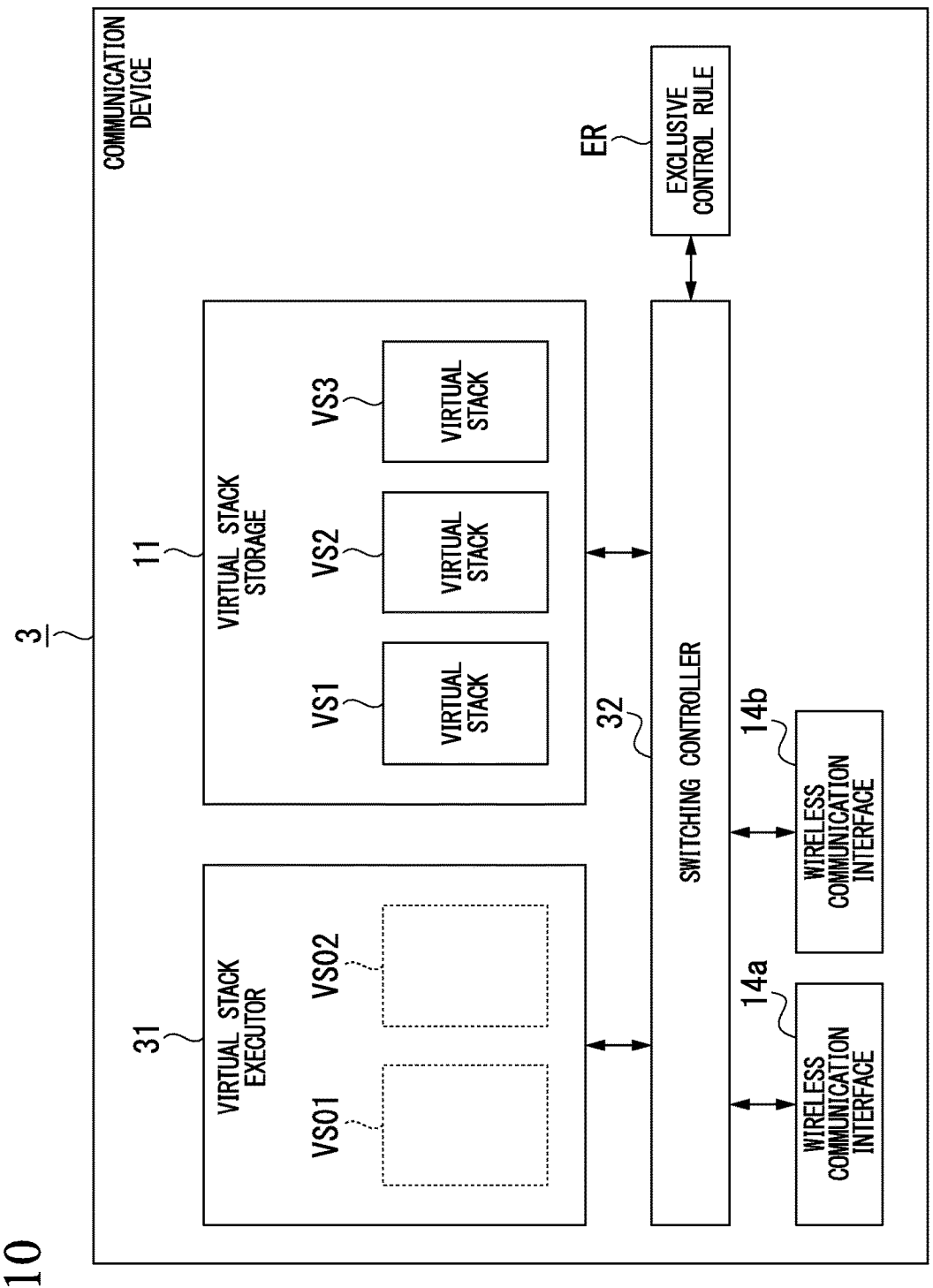
FIG. 10 is a block diagram showing the main parts of the constitution of a communication device according to a third embodiment of the present invention.

FIG. 10 is a block diagram showing the main parts of the constitution of a communication device according to the third embodiment of the present invention. As shown in FIG. 10, in addition to having a virtual stack executor 31 and a switching controller 32 in place of the virtual stack executor 12 and the switching controller 13 of the communication device 1 shown in FIG. 1, a communication device 3 of the third embodiment has two wireless communication interfaces 14a and 14b in place of the wireless communication interface 14. The virtual stack storage 11 holds three virtual stacks VS1 to VS3. The number of stacks held in the virtual stack storage 11 is arbitrary, to the extent permitted by the capacity of the virtual stack storage 11. For example, the virtual stack storage 11 may hold four or more virtual stacks.

The virtual stack executor 31, similar to the virtual stack executor 12 shown in FIG. 1, executes a virtual stack read from the virtual stack storage 11. However, a difference with respect to the virtual stack executor 12 shown in FIG. 1 is that any two virtual stacks of the virtual stacks VS1 to VS3 held in the virtual stack storage 11 can be executed simultaneously. In FIG. 10, as an aid to understanding, the virtual stacks to be executed by the virtual stack executor 31 are expressed as being virtual stacks VS01 and VS02 shown by the broken lines.

The switching controller 32 switches the virtual stack to be executed by the virtual stack executor 31, and can switch any one of the virtual stacks to be executed by the virtual stack executor 31 or switch both two virtual stacks to be executed by the virtual stack executor 31. The switching controller 32 switches the virtual stacks while referencing a pre-configured exclusive control rule ER.

The above-noted exclusive control rule ER establishes a rule for preventing contention for the wireless communication interfaces used by the virtual stacks VS01 and VS02 executed by the virtual stack executor 31. The exclusive control rule ER includes, for example, a rule establishing execution of virtual stacks VS01 and VS02 by the virtual stack executor 31, using the wireless communication interfaces 14a and 14b, respectively.

The wireless communication interfaces 14a and 14b, similar to the wireless communication interface 14 shown in FIG. 1, receive data transmitted from outside the communication device 3 as a wireless signal and transmit data to be transmitted outside the communication device 3 as a wireless signal. The wireless communication interfaces 14a and 14b correspond to a physical layer as established in, for example, the IEEE 802.15.4 wireless communication standard.

Figure 12:
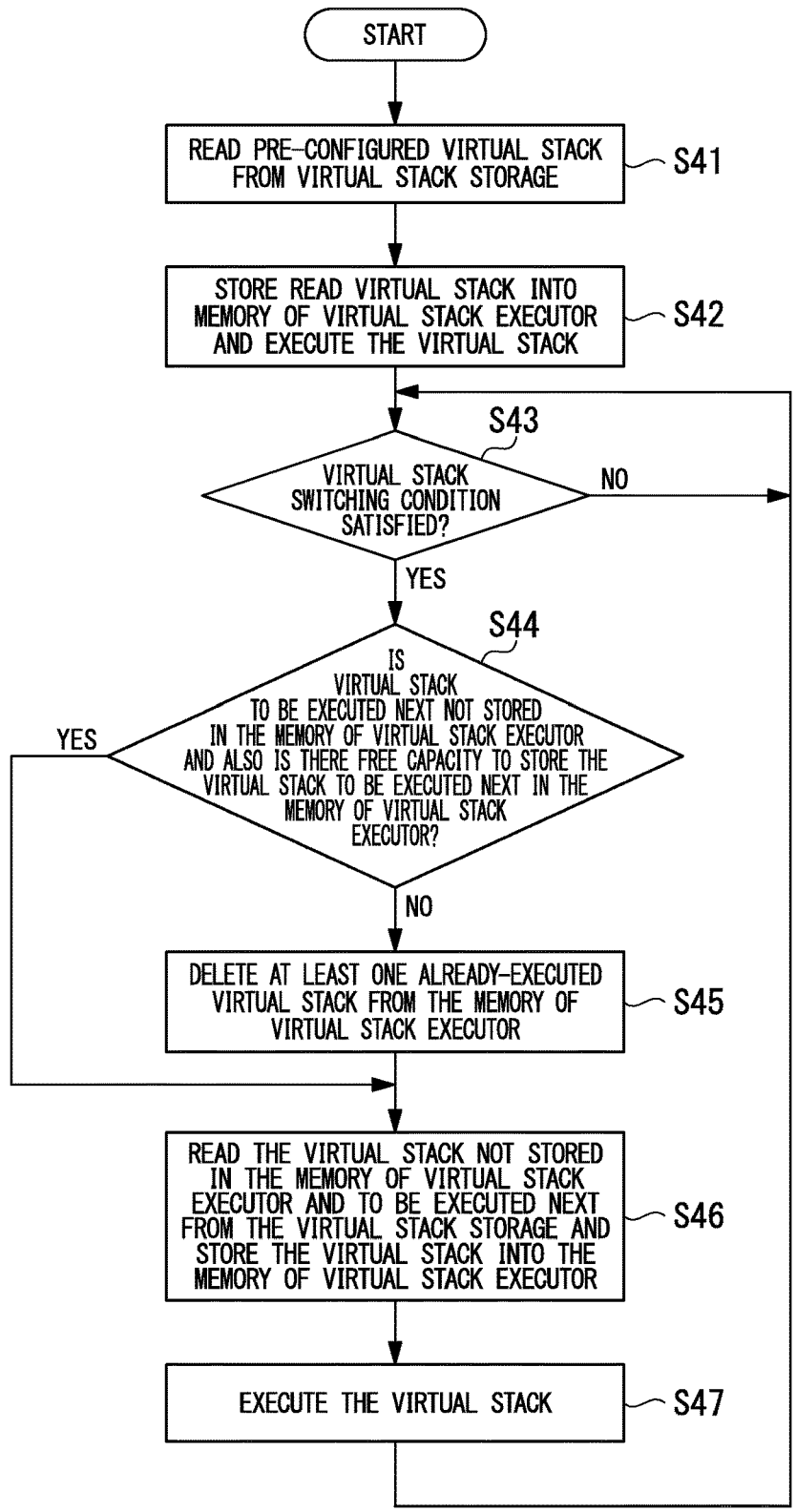
FIG. 12 is a flowchart showing operation in the communication device according to the third embodiment of the present invention.

In the communication device 3 having the constitution noted above, operation is performed according to the flowchart shown in FIG. 12. That is, first, when the power is applied to the communication device 3 and it starts, the switching controller 32 reads the pre-configured two virtual stacks from the virtual stack storage 11 (step S41), and the two virtual stacks are stored into the memory of the virtual stack executor 31 and executed by the virtual stack executor 31 (step S42). In the third embodiment, the two virtual stacks read at step S41 are taken to be the virtual stacks VS1 and VS2.

When the above-noted processing has been completed, the switching controller 32 judges whether or not the conditions for switching of the virtual stack is satisfied (step S43). Then, if the judgment is that the condition for switching of the virtual stack has not been satisfied (NO judgment result at step S43), the switching controller 32 repeats the judgment at step S43. However, if the judgment is made that the condition for switching of the virtual stack has been satisfied (YES judgment result at step S43), verification is made as to whether there is free capacity in the memory of the virtual stack executor 31 to store that virtual stack to be executed next (switched), which is not stored in the memory of the virtual stack executor 31 (step S44). In the third embodiment, the virtual stacks to be executed (switched) next in the memory of the virtual stack executor 31 are taken to be the virtual stacks VS2 and VS3. Therefore, at step S44, the virtual stack that is not stored in the memory of the virtual stack executor 31 and will be executed (switched) next is the virtual stack VS3. Next, if there is free capacity in the memory of the virtual stack executor 31 to store the virtual stack VS3 (YES verification result at step S44), the virtual stack VS3 is read from the virtual stack storage 11 and stored into the memory of the virtual stack executor 31 (step S46) and the virtual stack VS3 that has been read and the virtual stack VS2 that had been stored into the memory of the virtual stack executor 31 beforehand are executed (step S47). If, however, there is no free capacity in the memory of the virtual stack executor 31 to store the virtual stack VS3 (NO verification result at step S44), at least one virtual stack that has already been executed (virtual stack VS1 in the third embodiment) is deleted from the memory of the virtual stack executor 31 (step S45), the virtual stack VS3 is read from the virtual stack storage 11 and stored into the memory of the virtual stack executor 31 (step S46), and the virtual stack VS3 that has been read and the virtual stack VS2 that had been stored into the memory of the virtual stack executor 31 beforehand are executed (step S47). If each of the virtual stacks VS1 to VS3 includes a plurality of subprograms, the programs may be read from the virtual stack storage 11 in units of these subprograms, stored into the memory of, and executed, by the virtual stack executor 31, and deleted from the memory.

As noted above, the communication device 3 of the third embodiment is configured to store into the virtual stack storage 11 the virtual stacks VS1 to VS3 in each of which an application program and a communication program that implements a protocol stack required for performing a communication by the application program are associated, and to switch, by the switching controller 32, the virtual stack to be executed by the virtual stack executor 31. For this reason, even if the communication device 3 has a minimum required hardware configuration so as to operate with energy efficiency, it is possible to implement a plurality of functions communicating in conformance with different wireless communication standards while performing energy-efficient operation.

Figure 11:
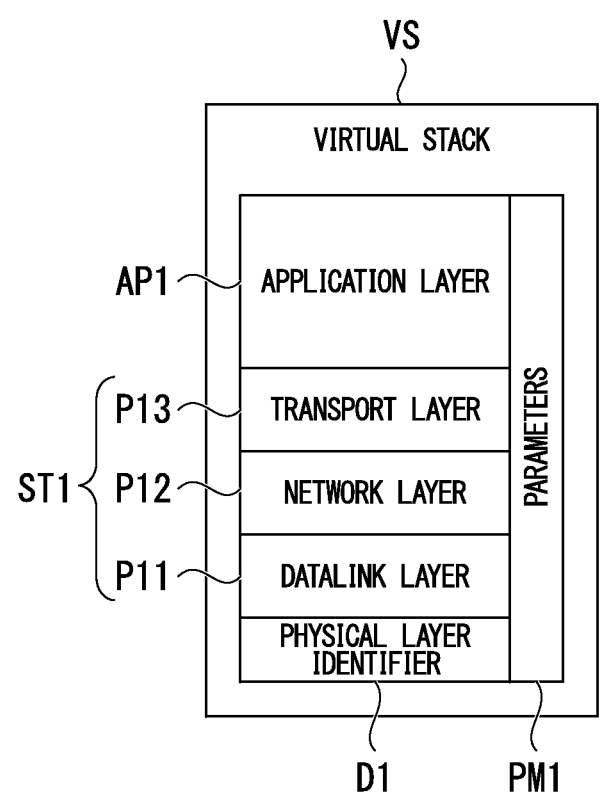
FIG. 11 is a drawing showing another example of a virtual stack.

If a plurality of wireless communication interfaces 14a and 14b are provided such as the communication device 3 of the third embodiment described above, information identifying a wireless communication interface may be included in the virtual stack as shown in FIG. 11. FIG. 11 shows another example of a virtual stack. The virtual stack VS shown in FIG. 11 further includes a physical layer identifier D1 (identifying information) that identifies any one of the wireless communication interfaces 14a and 14b in the virtual stack VS1 shown in FIG. 2.

When a virtual stack VS such as this is executed by a virtual stack executor (for example, the virtual stack executor 31), a switching controller (for example, the switching controller 32) references the physical layer identifier D1 included in the virtual stack VS. Under the control of the switching controller, data input and output are performed between the protocol stack ST1 implemented by execution of the virtual stack VS and the wireless communication interface identified by the physical layer identifier D1.

Although the foregoing has been a description of communication devices according to embodiments of the present invention, the present invention is not restricted by the foregoing embodiments and may be freely modified within the scope thereof. For example, although in the above-described embodiments, the communication devices 1 to 3 are described by giving the example for communicating wirelessly, the present invention is applicable not only to a communication device that communicates wirelessly, but also to a communication device that communicates by cable.

REFERENCE NUMERALS 1 to 3 Communication device
11 Virtual stack storage
12 Virtual stack executor
13 Switching controller
14, 14a, 14b Wireless communication interface
21 Virtual stack executor
31 Virtual stack executor
32 Switching controller
AP1, AP2 Application program
AP11, AP12 Application program
D1 Physical layer identifier
E1, E2 Event
P11 to P13 Communication program
P21 to P23 Communication program
PM1, PM2 Parameters
R1 Information holding area
ST1, ST2 Protocol stack
VS1, VS2 Virtual stack
VS11 Virtual stack
VS12 Virtual stack

The invention claimed is:

1. A field device capable of communicating in conformance with a plurality of communication standards, the field device comprising:
a storage storing a plurality of virtual stacks, each of the plurality of virtual stacks including an application program that implements functionality of the field device and a communication program that implements a protocol stack for communication by the application program and is associated with the application program;
an executor configured to simultaneously execute any two virtual stacks of the plurality of virtual stacks;
a switching controller configured to switch the virtual stacks to be executed in the executor by performing a first processing in which the two virtual stacks partially selected from the plurality of virtual stacks are read from the storage and stored into a memory of, and executed by, the executor, and then, if there is no free capacity in the memory of the executor to store at least one of the remaining of the plurality of virtual stacks, which is not stored in the memory, other than the two virtual stacks executed in the first processing, deleting from the memory at least one of the two virtual stacks executed in the first processing, and performing a second processing in which at least one virtual stack, which is not stored in the memory, other than the two virtual stacks executed in the first processing is read from the storage and stored into the memory of, and executed by, the executor; and
a plurality of communication interfaces configured to communicate with outside of the field device,
wherein each of the plurality of virtual stacks includes identifying information that identifies one communication interface among the plurality of the communication interfaces; and
wherein the switching controller is configured to reference the identifying information included in each of the two virtual stacks to be executed by the executor that is implemented by a CPU and to perform data input and output between the protocol stack implemented by execution of the two virtual stacks and the one wireless communication interface identified by the identifying information; and
further comprising a switching rule pre-establishing a rule requiring switching,
wherein the switching controller recognizes a state of the field device and switches the virtual stacks by referencing the switching rule,
wherein the switching rule establishes the field device going into a state of experiencing communication difficulty, the remaining amount of life of a battery provided in the field device having fallen below a prescribed amount, and the field device going into a state of starting or restarting, and
wherein, when the switching controller detects that the field device has gone into a state established in the switching rule, the switching controller switches the virtual stacks.

2. The field device according to claim 1, wherein each of the virtual stacks has parameters used in at least one of the application programs and the communication program.

3. The field device according to claim 1, further comprising:
a switching table in which information indicating virtual stacks that are objects to be switched is established beforehand,
wherein when an event occurring outside or inside of the field device is input, the switching controller switches the virtual stacks, based on the event, by referencing the switching table.

4. The field device according to claim 1, further comprising:
a timer,
wherein the switching controller switches the virtual stacks based on a time measured by the timer.

5. The field device according to claim 1, wherein the executor comprises an information holding area that holds information passed between the virtual stack to be executed in the first processing and the virtual stack to be executed in the second processing.

6. The field device according to claim 1, wherein if the switching controller verifies that the virtual stack to be executed in the second processing is not stored into the memory of the executor and also that there is free capacity in the memory to store the virtual stack to be executed in the second processing after the first processing is performed, the switching controller does not perform the deletion processing.

7. A method of controlling an execution of stacks in a field device capable of communicating in conformance with a plurality of communication standards, the method including:
a step of performing a first processing whereby any two virtual stacks partially selected from a plurality of virtual stacks are stored into a memory of, and simultaneously executed by, an executor of the field device;
a step, after performing the first processing, of judging a condition for switching the virtual stack to be executed in the executor that is implemented by a CPU;
a step of, if the switching condition is satisfied and there is no free capacity in the memory of the executor to store at least one of the remaining of the plurality of virtual stacks, which is not stored in the memory, other than the two virtual stacks executed in the first processing, deleting at least one of the two virtual stacks executed in the first processing from the memory; and
a step of, after deleting from the memory the at least one of the two virtual stacks executed in the first processing, performing a second processing, whereby at least one virtual stack, which is not stored in the memory, other than the two virtual stacks executed in the first processing is stored into the memory of, and executed by, the executor, wherein:
each of the plurality of virtual stacks includes identifying information that identifies one communication interface among a plurality of the communication interfaces of the field device; and
the method further includes a step of referencing the identifying information included in each of the two virtual stacks to be executed by the executor and performing data input and output between the protocol stack implemented by execution of the two virtual stacks and the one wireless communication interface identified by the identifying information, and
wherein the step of judging a condition for switching the virtual stack to be executed in the executor, based on the state of the field device, judges the switching condition by referencing a pre-configured switching rule,
wherein the switching rule establishes the field device going into the state of experiencing communication difficulty, the remaining amount of life of a battery provided in the field device having fallen below a prescribed amount, and the field device going into a state of starting or restarting; and
wherein, when detecting that the field device has gone into a state established in the switching rule, the step of judging a virtual stack switching condition to be executed in the executor judges that the virtual stack switching condition is satisfied.

8. The method according to claim 7, wherein the step of judging a condition for switching the virtual stack to be executed in the executor, based on an event occurring outside or inside of the field device, judges the switching condition by referencing a switching table in which information indicating virtual stacks that are objects to be switched is established beforehand.

9. The method according to claim 7, wherein the step of judging a condition for switching the virtual stack to be executed in the executor judges the switching condition based on a time or the virtual stack execution time.

10. The method according to claim 7, wherein the step of deleting from the memory the at least one of the two virtual stacks executed in the first processing, does not perform the deletion processing when the at least one virtual stack to be executed in the second processing is not stored into the memory of the executor and also there is free capacity in the memory to store the at least one virtual stack to be executed in the second processing.

11. The field device according to claim 1, wherein:
each of the plurality of virtual stacks stored in the storage comprises a plurality of divided virtual stacks; and
the switching controller is configured to switch the virtual stacks to be executed in the executor by performing the first processing in which any two divided virtual stacks of the divided virtual stacks are read from the storage and stored into the memory of, and executed by, the executor, and then, deleting from the memory at least one of the two divided virtual stacks executed in the first processing, and performing the second processing in which at least one divided virtual stack, which is not stored in the memory, other than the two divided virtual stacks executed in the first processing is read from the storage and stored into the memory of, and executed by, the executor.

12. The method according to claim 7, wherein:
each of the plurality of virtual stacks comprises a plurality of divided virtual stacks;
the step of performing the first processing includes storing any two divided virtual stacks of the divided virtual stacks into the memory of the executor and executing the two divided virtual stacks;
the step of deleting from the memory the at least one of the two virtual stacks executed in the first processing includes deleting at least one of the two divided virtual stacks from the memory; and
the step of performing the second processing includes storing into the memory of the executor and executing at least one divided virtual stack, which is not stored in the memory, other than the two divided virtual stacks executed in the first processing.

13. The field device according to claim 1,
wherein:
the virtual stack to be executed in the first processing is divided into a first part including a program that transmits and receives data via the protocol stack and a second part including a program that implements at least the pre-processing or post-processing of data,
in a receiving operation of data from outside of the field device, the switching controller is configured to read the first part from the storage, to store the first part into the memory of the executor, and to cause the first part to be executed by the executor, and then, to read the second part from the storage, to store the second part into the memory of the executor, and to cause the second part to be executed by the executor, and the switching controller is configured to delete the first part from the memory if there is no free capacity in the memory to store the second part after the first part is executed, and
in a transmission operation of data to outside of the field device, the switching controller is configured to read the second part from the storage, to store the second part into the memory of the executor, and to cause the second part to be executed by the executor, and then, to read the first part from the storage, to store the first part into the memory of the executor, and to cause the first part to be executed by the executor, and the switching controller is configured to delete the second part from the memory if there is no free capacity in the memory to store the first part after the second part is executed.

14. The field device according to claim 1, wherein the virtual stack to be executed in the first processing is divided into a first part including a program that transmits and receives data via the protocol stack and a second part including a program that implements at least the pre-processing or post-processing of data, and
the switching controller is configured to cause the first part to be executed by the executor in place of the second part if the switching controller detects a problem during execution of the second part.

15. The field device according to claim 13, wherein the executor comprises an information holding area that holds information passed between the first part and the second part.

* * * * *